(12) United States Patent
Pfnuer

(10) Patent No.: US 7,703,992 B2
(45) Date of Patent: Apr. 27, 2010

(54) SINGLE PIECE DIPLEXER AND TRIPLEXER HOUSING

(75) Inventor: Stefan Pfnuer, Redwood City, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 12/028,519

(22) Filed: Feb. 8, 2008

(65) Prior Publication Data

US 2008/0193088 A1 Aug. 14, 2008

Related U.S. Application Data

(60) Provisional application No. 60/900,263, filed on Feb. 8, 2007, provisional application No. 60/961,190, filed on Jul. 17, 2007.

(51) Int. Cl.
*G02B 6/36* (2006.01)

(52) U.S. Cl. ............... 385/92; 385/91; 385/90

(58) Field of Classification Search ............... 385/90–92
See application file for complete search history.

(56) References Cited

U.S. PATENT DOCUMENTS 4,904,043 A 2/1990 Schweizer

| | | | |
|---|---|---|---|
| 6,040,934 A * | 3/2000 | Ogusu et al. | 398/139 |
| 6,749,347 B1 * | 6/2004 | Ichihara et al. | 385/93 |
| 2002/0028049 A1 * | 3/2002 | Bartur et al. | 385/92 |
| 2003/0147601 A1 * | 8/2003 | Bartur et al. | 385/92 |
| 2008/0175591 A1 * | 7/2008 | Yu et al. | 398/65 |

FOREIGN PATENT DOCUMENTS

| | | |
|---|---|---|
| JP | 63-2252206 | 9/1988 |
| JP | 05-215935 | 8/1993 |
| KR | 10-2006-0023916 | 3/2006 |
| KR | 10-2006-0102783 | 9/2006 |

* cited by examiner

*Primary Examiner*—Sung H Pak
*Assistant Examiner*—Eric Wong
(74) *Attorney, Agent, or Firm*—Workman Nydegger

(57) ABSTRACT

A single piece optoelectronic module housing is disclosed herein. The housing comprises a first receptacle configured to receive a first optical assembly, a second receptacle configured to receive a second optical assembly, and a third receptacle configured to receive an optical fiber. In some embodiments at least one angled surface configured to have a filter placed thereon is included. In other embodiments, two or more angled pocket receptacles configured to have one or more optical elements placed therein are included. Further embodiments include at least one compliant press fit feature implemented as part of one of the receptacles. The optoelectronic module housing is a single piece housing configured such that the receptacles and other components are integral parts of the single piece housing.

7 Claims, 11 Drawing Sheets

SINGLE PIECE DIPLEXER AND TRIPLEXER HOUSING

CROSS-REFERENCE TO RELATED APPLICATIONS

This application claims the benefit of U.S. Provisional Application Ser. No. 60/900,263, filed Feb. 8, 2007, and U.S. Provisional Application No. 60/961,190, filed Jul. 17, 2007, both of which are incorporated herein by reference in their entirety.

BACKGROUND

For the fiber to the home market and other fiber markets, bidirectional and triple-bidirectional data transmission is often required, which in turn requires multiple elements to be packaged and aligned in an optoelectronic module. Typical examples of such modules that include multiple elements are a bidirectional module, also known as a diplexer, and triple bidirectional module, also known as a triplexer.

A common approach to manufacturing both diplexers and triplexer modules is to create a housing that is implemented as two or more pieces. The two or more pieces are then fit together using known fabrication processes. Often, however, this multiple piece approach requires two or more fabrication operations to achieve the necessary accuracy and/or function of all the features. Accordingly, the multiple piece approach is expensive and time consuming.

Accordingly, what would be useful in the art is to have a single piece diplexer and/or triplexer housing that easy to manufacture and is low cost.

BRIEF SUMMARY

An embodiment disclosed herein relates to single piece optoelectronic module housing. The housing comprises a first receptacle configured to receive a first optical assembly, a second receptacle configured to receive a second optical assembly, a third receptacle configured to receive an optical fiber, and at least one angled surface configured to have a filter placed thereon. At least one compliant press fit feature is implemented as part of one of the receptacles. The optoelectronic module housing is a single piece housing configured such that the receptacles and angled surface are integral parts of the single piece housing.

An additional embodiment disclosed herein relates to single piece optoelectronic module housing. The housing comprises a first receptacle configured to receive a first optical assembly, a second receptacle configured to receive a second optical assembly, a third receptacle configured to receive a third optical assembly, and a fourth receptacle configured to receive an optical fiber. The housing also comprises a first angled pocket receptacle configured to have one or more optical elements placed therein and a second angled pocket receptacle configured to have one or more optical elements placed therein. The optoelectronic module housing is a single piece housing configured such that the receptacles and angled pocket receptacles are integral parts of the single piece housing.

A further embodiment disclosed herein relates to single piece optoelectronic module housing. The housing comprises a first receptacle configured to receive a first optical assembly, a second receptacle configured to receive a second optical assembly, a third receptacle configured to receive a third optical assembly, and a fourth receptacle configured to receive an optical fiber. The housing also comprises a first angled pocket receptacle configured to have one or more optical elements placed therein, a second angled pocket receptacle configured to have one or more optical elements placed therein, and at least one compliant press fit feature implemented as part of one of the receptacles. The optoelectronic module housing is a single piece housing configured such that the receptacles and angled pocket receptacles are integral parts of the single piece housing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to figures wherein like structures will be provided with like reference designations. It is understood that the drawings are diagrammatic and schematic representations of exemplary embodiments of the invention, and are not limiting of the present invention nor are they necessarily drawn to scale. It is also understood that reference to a "first", or a "second" etc. element (such as a first and second receptacle) in this description and in the claims is meant to distinguish one element from another and is not meant to imply sequential ordering unless explicitly stated.

Reference is first made to FIGS. 1A-1D, which illustrate different views of one embodiment of a one piece diplexer housing in accordance with the principles of the present invention, designated generally at 100. Note that the embodiment of FIGS. 1A-1D is only one of numerous embodiments in which the principles of the present invention may be practiced and should not be used to limit the scope of the appended claims.

Diplexer 100 is implemented as a one piece housing, which may be manufactured using Metal Injection Molding (MIM) processes as will be described in further detail to follow. In some embodiments, diplexer 100 may be made from metal. Examples of metals that may be used include, but are not limited to, carbon steel, and 416 steel. Other suitable materials known in the art may also be used to make triplexer diplexer 100. Since only one piece is used as a housing, additional required alignment and attachment steps of multiple piece housings are reduced to a minimum, resulting in higher reliability and lower assembly cost when compared to multiple piece housings.

Figure 1A:
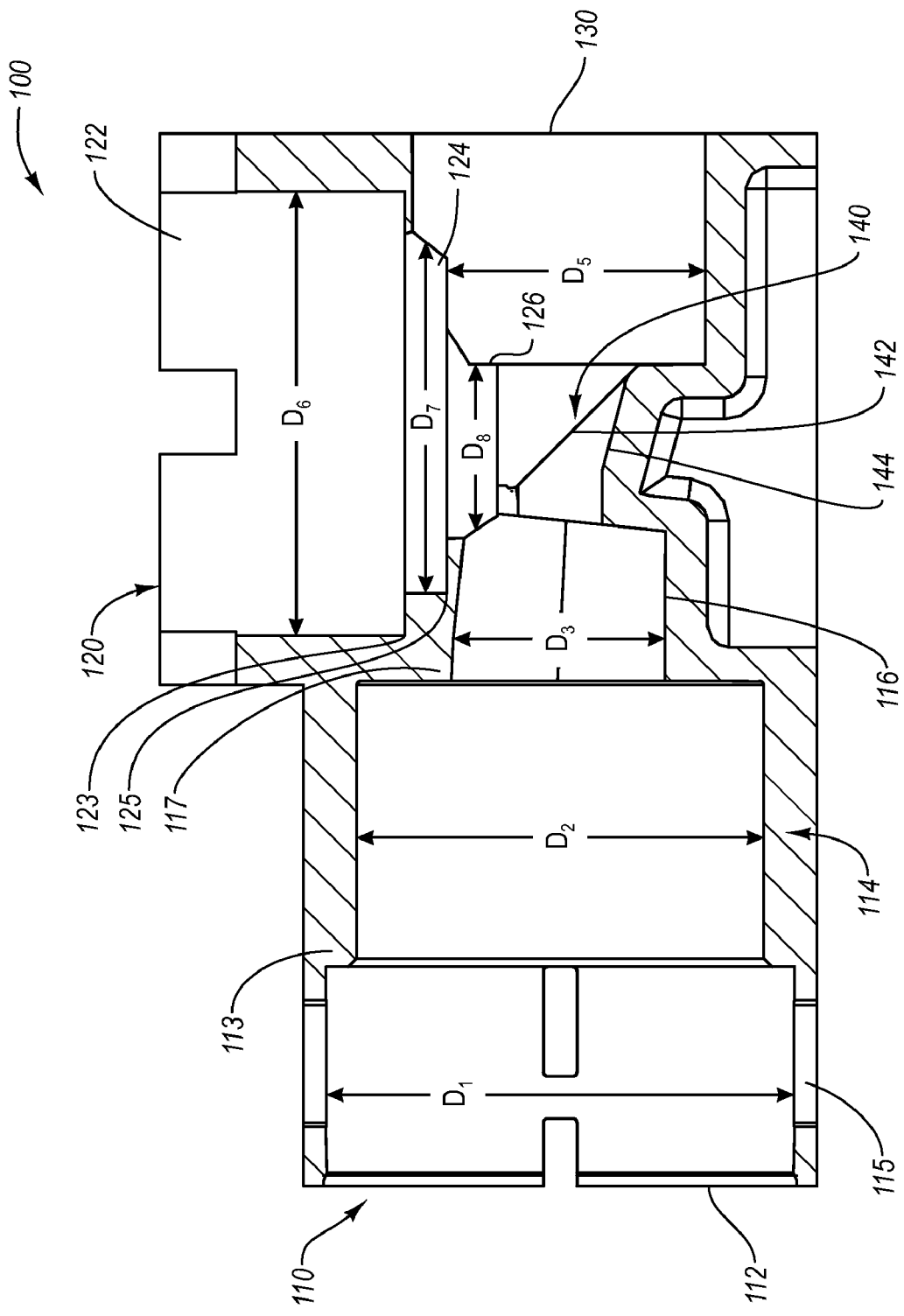
FIGS. 1A-1D illustrate an embodiment of a single piece diplexer housing in accordance with the principles of the present invention.
Figure 1B:
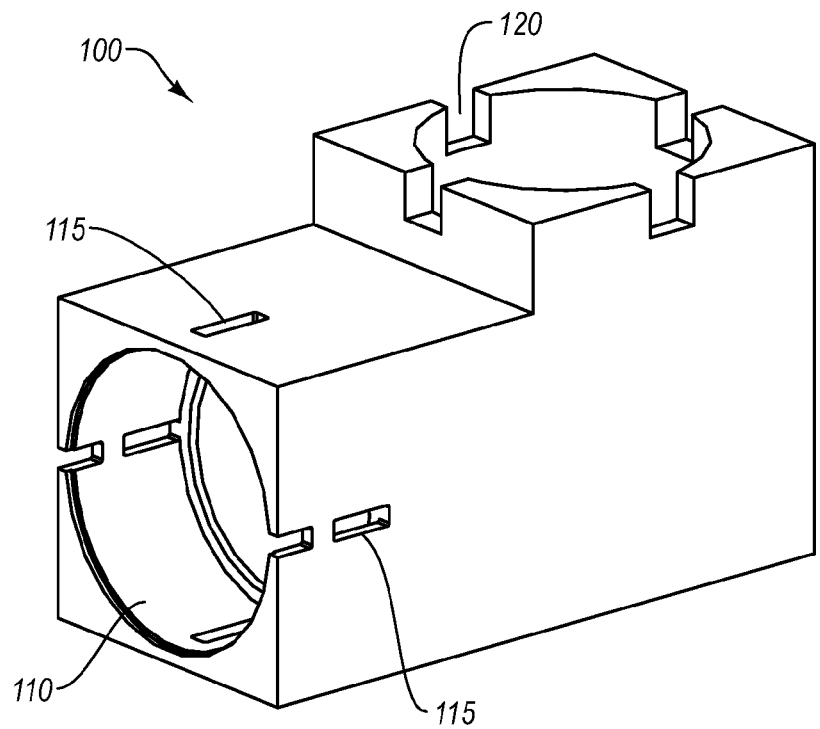
Figure 1C:
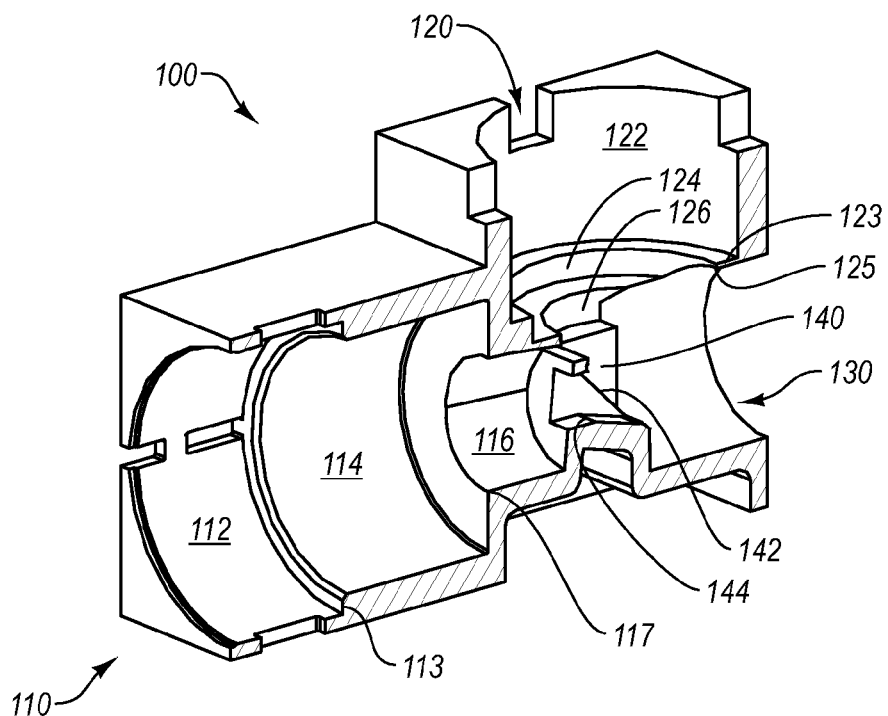
Figure 1D:
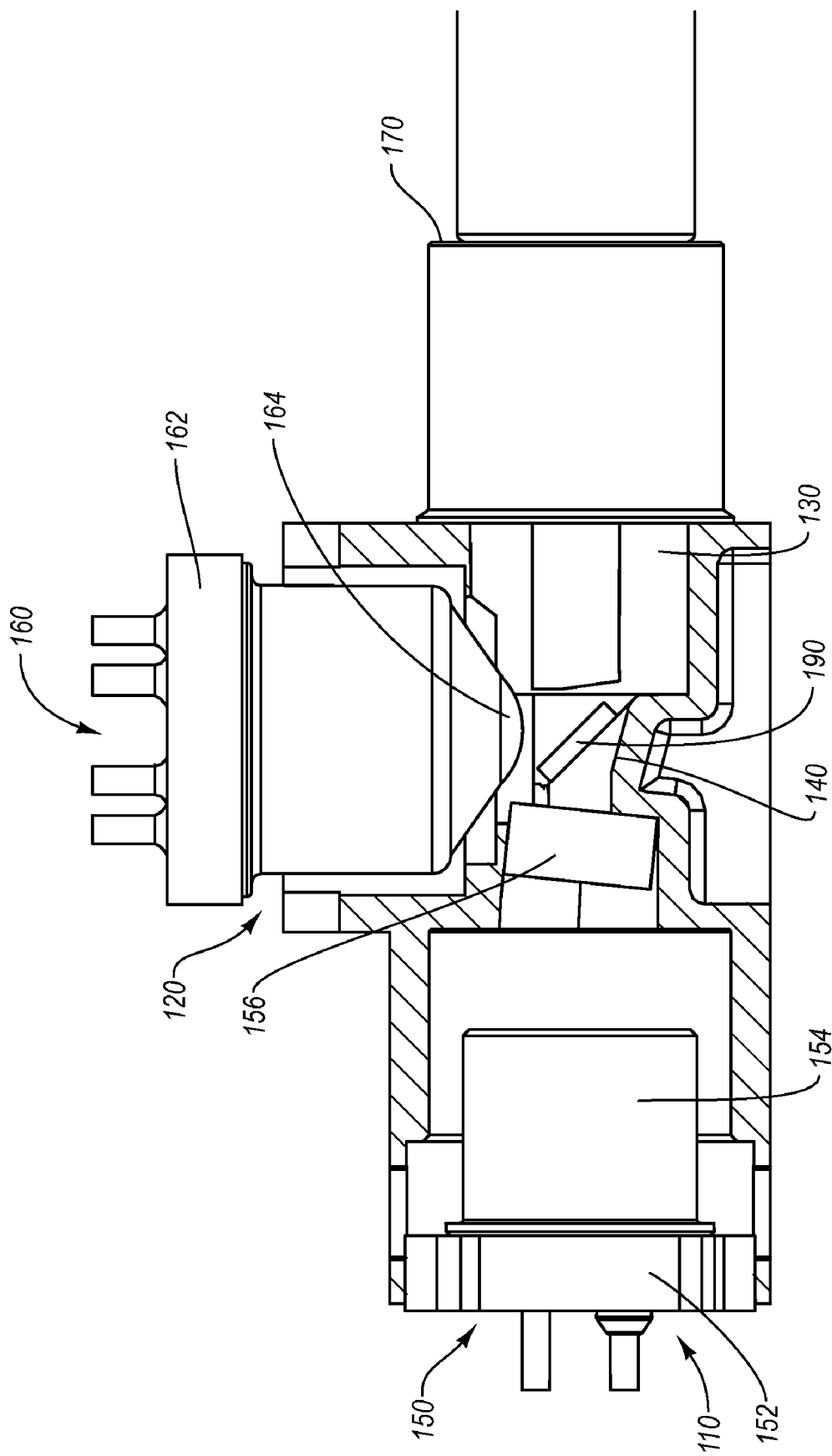

As shown in FIGS. 1A-1D, diplexer 100 includes a first receptacle 110 that is configured to hold an optical device such as an optical transmitter assembly 150. As illustrated, first receptacle 110 has two stepped diameters. For example, a first portion 112 has a diameter D1. As is illustrated in FIG. 1D, diameter D1 is sized large enough to receive a laser header 152.

Receptacle 110 also includes a second portion 114 that has a diameter D2 that is typically smaller than diameter D1. As illustrated, the change or step between the diameters of portions 112 and 114 creates a step 113 inside of receptacle 110. As is illustrated in FIG. 1D, diameter D2 is sized large enough to receive a laser can 154.

A third portion 116 of receptacle 110 has a diameter D3 that is typically smaller than diameter D2. As illustrated, the change or step between the diameters of portions 114 and 116 creates a step 117 inside of receptacle 110. As is illustrated in FIG. 1D, diameter D3 is sized large enough to receive an optical isolator 156, which may or may not be part of laser assembly 150.

In like manner, diplexer 100 includes a second receptacle 120 that is configured to hold an optical assembly such as a photodiode assembly 160. As illustrated, second receptacle 120 has two stepped diameters. For example, a first portion 122 has a diameter D6. As is illustrated in FIG. 1D, diameter D6 is sized large enough to receive a photodiode header 162.

Receptacle 120 also includes a second portion 124 that has a diameter D7 that is typically smaller than diameter D6. As illustrated, the change or step between the diameters of portions 122 and 124 creates a step 123 inside of receptacle 120. As is illustrated in FIG. 1D, diameter D7 is sized large enough to receive a nose portion of assembly 160.

A third portion 126 of receptacle 120 has a diameter D8 that is typically smaller than diameter D7. As illustrated, the change or step between the diameters of portions 124 and 126 creates a step 125 inside of receptacle 120. As is illustrated in FIG. 1D, diameter D8 is sized large enough to receive a photodiode lens 164.

Diplexer 100 also includes a third receptacle 130 that is configured to receive an optical fiber such as fiber 170. Receptacle 130 has a diameter D5 that is sized large enough to receive the fiber.

As also illustrated, diplexer 100 further includes a pocket 140 for selective filter alignment. Pocket 140 has angled surfaces 142 and 144, with angled surface 142 being where the selective filter, such as filter 190 of FIG. 1D, may be placed inside single piece diplexer 100. Angled surface 142 allows for convenient positioning of filter 190 before it is attached permanently to the surface with epoxy, which results in faster and more accurate attachment. Angled surfaces 142 and 144 are configured to reduce cross talk and/or back reflection between optical signals during operation of diplexer 100.

Note that pocket 140 is a through pocket that allows an optical signal to be transmitted between an optical assembly residing in first receptacle 110 and the fiber residing in third receptacle 130 and allows an optical signal to be transmitted between an optical assembly residing in second receptacle 120 and the fiber residing in third receptacle 130. Advantageously, pocket 140 is an integral part of diplexer 100, thus removing the need for separate parts to house filter 190.

Referring now to FIG. 1D, a one piece diplexer 100 is shown fully populated with various optical assemblies, filters, and an optical fiber. As previously described, transmit assembly 150 may be placed in first receptacle 110, photodiode assembly 160 may be placed in second receptacle 120 and fiber 170 may be placed in third receptacle 130. Note that the placement of the various components in a specific receptacle is for illustration only and is not to be used to limit the scope of the appended claims. One of skill in the art will appreciate that the various components may be placed in other receptacles as circumstances warrant.

Returning now to FIG. 1A, it is shown that first receptacle 110 includes compliant press fit features 115. In this embodiment, the compliant press fit features are in the form of slots, although in other embodiments, compliant press fit features 115 may also be, but are not limited to, crush ribs or teeth. Note that the slots may have various shapes as they may also be angled or tapered. Compliant press fit features 115 allow for transmit assembly 150 to be press fit or interference fit into first receptacle 110. The use of compliant press fit features 115 advantageously allow for diplexer 100 to be manufactured as one piece using the inexpensive MIM process. Note that although FIG. 1A only shows receptacle 110 as including compliant press fit features 115, the other receptacles may also include compliant press fit features 115 as circumstances warrant.

Reference is now made to FIGS. 2A-2D, which illustrate different views of one embodiment of a one piece triplexer housing in accordance with the principles of the present invention, designated generally at 200. Note that the embodiment of FIGS. 2A-2D is only one of numerous embodiments in which the principles of the present invention may be practiced and should not be used to limit the scope of the appended claims.

Triplexer 200 may be manufactured using the MIM process. In some embodiments, triplexer 200 may be made from metal. Examples of metals that may be used include, but are not limited to, carbon steel, and 416 steel. Other suitable materials known in the art may also be used to make triplexer 200. Since only one piece is used as a housing, additional required alignment and attachment steps of multiple piece housings are reduced to a minimum, resulting in higher reliability and lower assembly cost when compared to multiple piece housings.

Figure 2A:
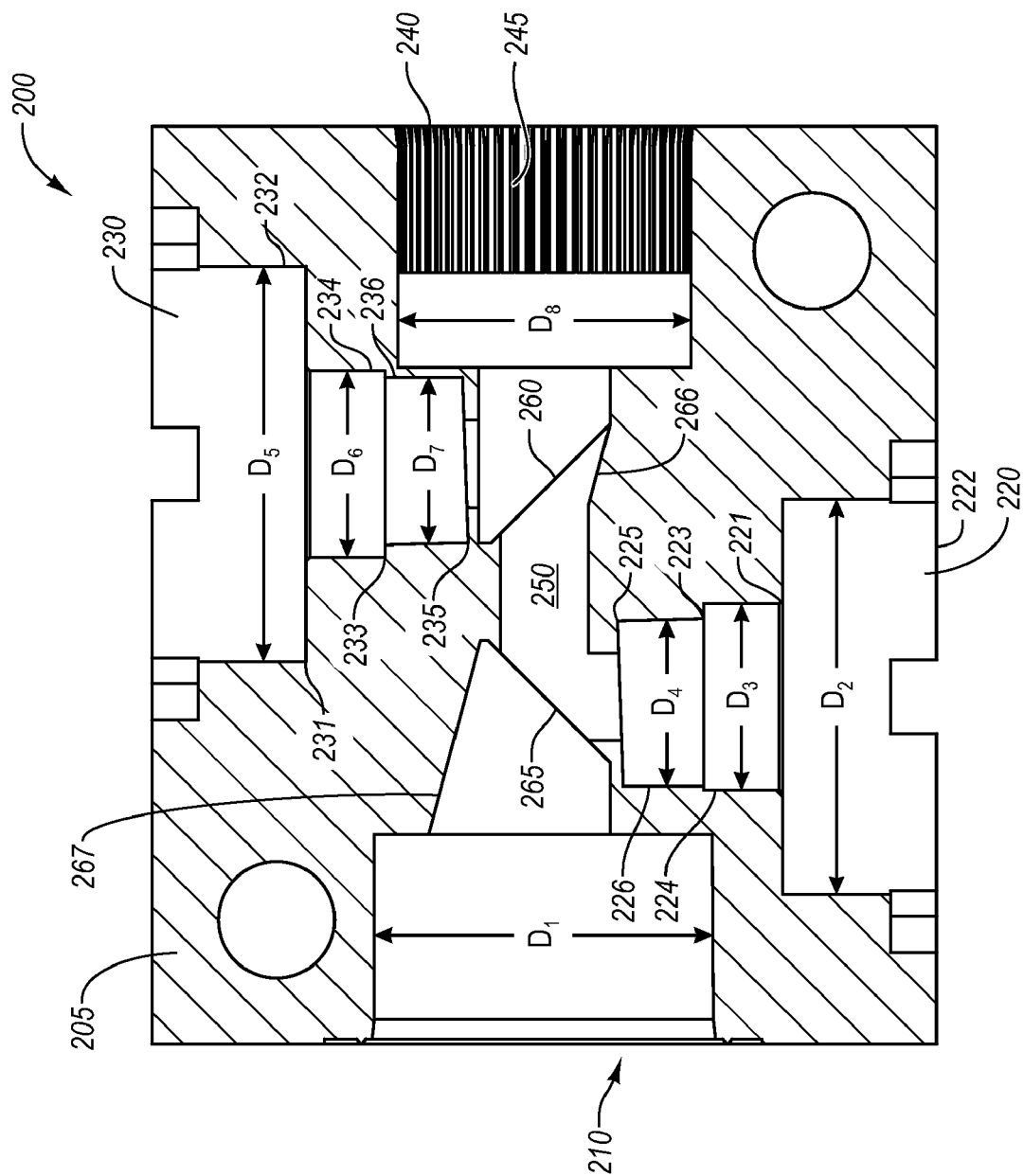
FIGS. 2A-2D illustrate an embodiment of a single piece triplexer housing in accordance with the principles of the present invention.
Figure 2B:
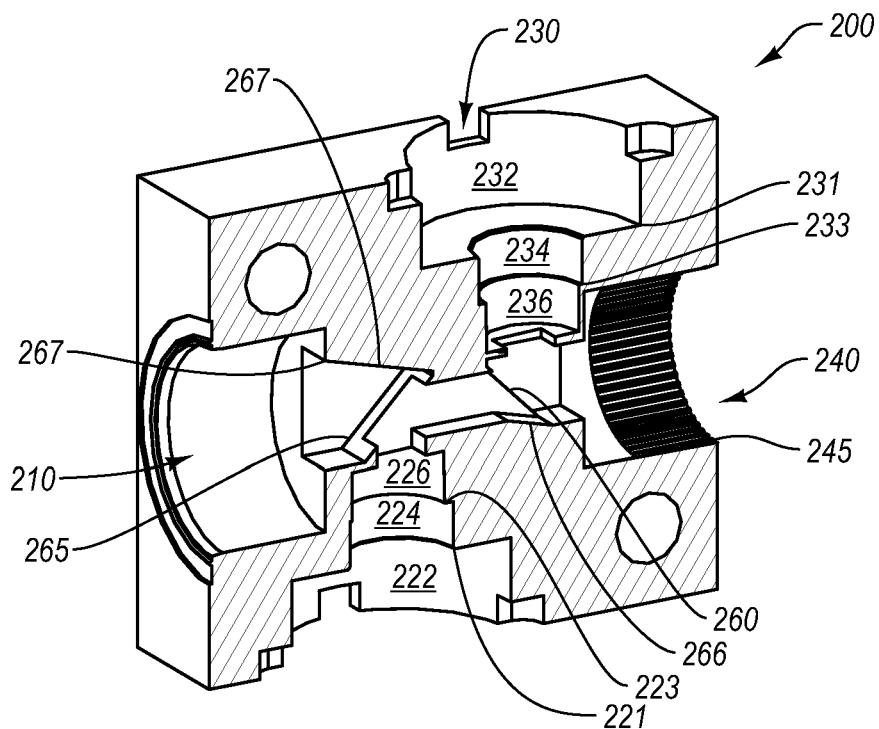
Figure 2C:
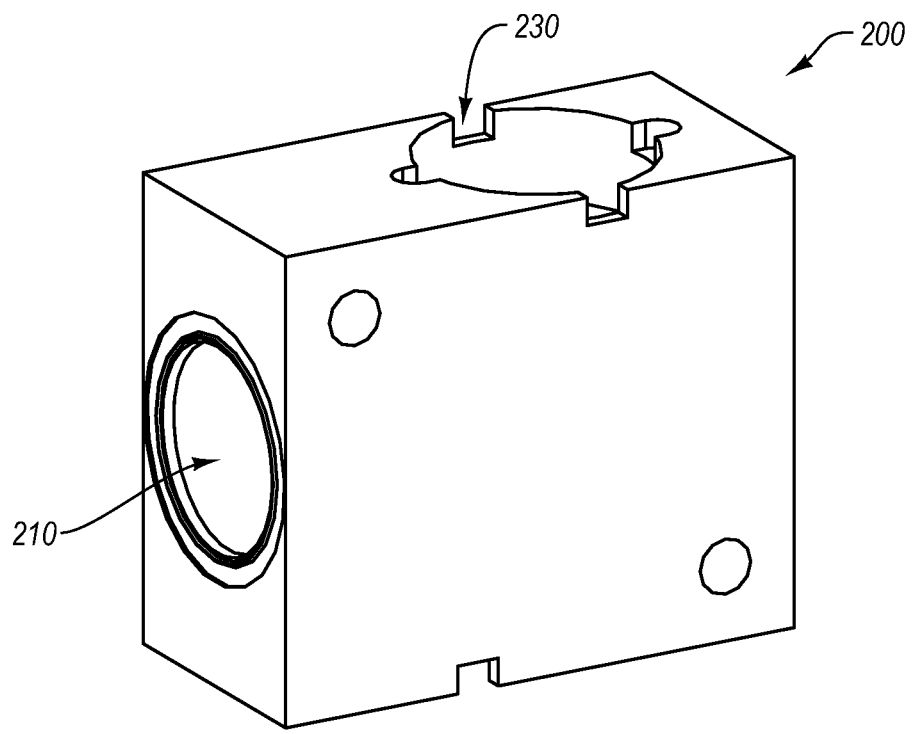
Figure 2D:
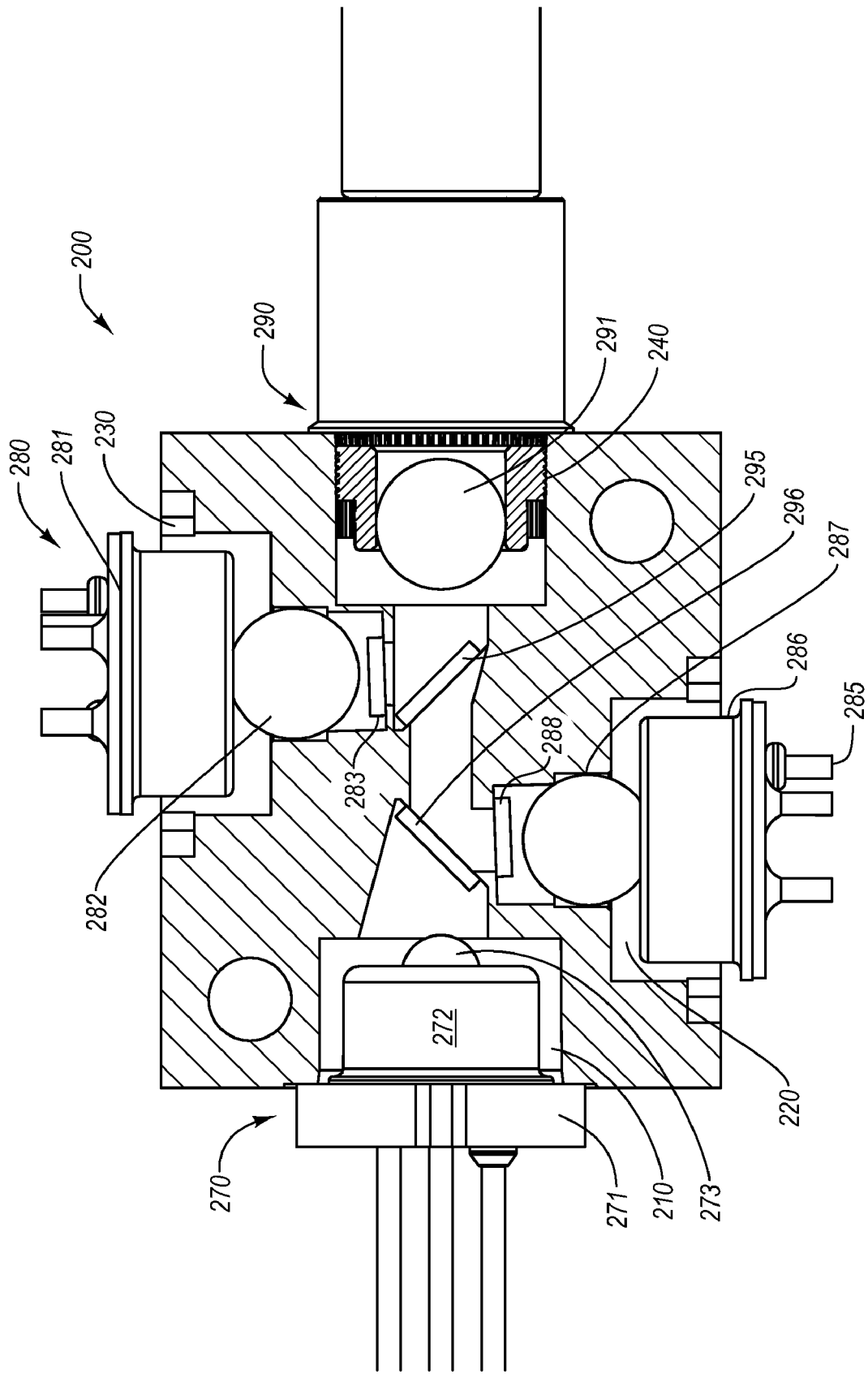

As further shown in FIGS. 2A-2D, triplexer 200 includes a first receptacle 210 that is configured to hold an optical device such as an optical transmitter assembly 270. As illustrated, first receptacle 210 has a diameter D1. As is illustrated in FIG. 2D, diameter D1 is sized large enough to receive the portions of assembly 270, namely laser header 271, laser can 272, and laser lens 273.

In addition, triplexer 200 includes a second receptacle 220 that is configured to hold an optical assembly such as a photodiode assembly 285. As illustrated, second receptacle 220 has two stepped diameters. For example, a first portion 222 has a diameter D2. As is illustrated in FIG. 2D, diameter D2 is sized large enough to receive a photodiode header 286.

Receptacle 220 also includes a second portion 224 that has a diameter D3 that is typically smaller than diameter D2. As illustrated, the change or step between the diameters of portions 222 and 224 creates a step 221 inside of receptacle 220. As is illustrated in FIG. 2D, diameter D3 is sized large enough to receive a photodiode lens 281.

A third portion 226 of receptacle 220 has a diameter D4 that is typically smaller than diameter D3. As illustrated, the change or step between the diameters of portions 224 and 226 creates a step 223 inside of receptacle 220. As is illustrated in FIG. 2D, diameter D4 is sized large enough to receive a portion of photodiode lens 287 and also to receive a blocking filter 288. In some embodiments, the surface 225 where blocking filter 288 is placed is angled to reduce back refection into the photodiode assembly.

In like manner, triplexer 200 includes a third receptacle 230 that is configured to hold an optical assembly such as a photodiode assembly 280. As illustrated, third receptacle 230 has two stepped diameters. For example, a first portion 232 has a diameter D5. As is illustrated in FIG. 2D, diameter D5 is sized large enough to receive a photodiode header 281.

Receptacle 230 also includes a second portion 234 that has a diameter D6 that is typically smaller than diameter D5. As illustrated, the change or step between the diameters of portions 232 and 234 creates a step 231 inside of receptacle 230. As is illustrated in FIG. 2D, diameter D5 is sized large enough to receive a photodiode lens 282.

A third portion 236 of receptacle 230 has a diameter D7 that is typically smaller than diameter D6. As illustrated, the change or step between the diameters of portions 234 and 236 creates a step 233 inside of receptacle 230. As is illustrated in FIG. 2D, diameter D7 is sized large enough to receive a portion of photodiode lens 282 and also to receive a blocking filter 283. In some embodiments, the surface 235 where blocking filter 283 is placed is angled to reduce back refection into the photodiode assembly.

Triplexer 200 also includes a fourth receptacle 240 that is configured to receive an optical fiber such as fiber 290. Receptacle 240 has a diameter D8 that is sized large enough to receive the fiber 290 and a fiber lens 291.

As further shown, triplexer 200 includes a rectangular through hole 250, which advantageously may be manufactured using the MIM process. Rectangular through hole 250 allows an optical signal to be transmitted between optical assemblies residing in first, second and third receptacles 210, 220, and 230 and a fiber residing in fourth receptacle 240.

Placed inside of rectangular through hole 250 are angled surfaces 260, 265, 266, and 267. Angled surfaces 260 and 265 are configured to hold selective filters 295 and 296 respectively. Angled surfaces 260 and 265 allow for convenient positioning of filters 295 and 296 before they are attached permanently to the surface with epoxy, which results in faster and more accurate attachment. Angled surfaces 260, 265, 266, and 267 are designed to reduce cross talk and/or back reflection between optical signals during operation of triplexer 200. Advantageously, rectangular through hole 250 and angled surfaces 260, 265, 266, and 267 are an integral part of triplexer 200, thus removing the need for separate parts to house filters 295 and 296.

Referring now to FIG. 2D, a one piece triplexer 200 is shown fully populated with various optical assemblies, filters, and an optical fiber. As previously described, transmit assembly 270 may be placed in first receptacle 210, photodiode assembly 285 may be placed in second receptacle 220, photodiode assembly 280 may be placed in third receptacle 230, and fiber 290 may be placed in fourth receptacle 240. Note that the placement of the various components in a specific receptacle is for illustration only and is not to be used to limit the scope of the appended claims. One of skill in the art will appreciate that the various components may be placed in other receptacles as circumstances warrant.

Returning now to FIG. 2A, it is shown that fourth receptacle 240 includes compliant press fit features 245. In this embodiment, the compliant press fit features are in the form of teeth, although in other embodiments, compliant press fit features 245 may also be, but are not limited to, crush ribs or slot such as those described in relation to FIG. 1A above. Compliant press fit features 245 allow for the fiber 290 or lens 291 to be press fit or interference fit into fourth receptacle 240. The use of compliant press fit features 245 advantageously allow for triplexer 200 to be manufactured as one piece using the inexpensive MIM process. Note that although FIG. 2A only shows receptacle 240 as including compliant press fit features 245, the other receptacles may also include compliant press fit features 245 as circumstances warrant.

Reference is now made to FIGS. 3A-3E, which illustrate different views of an alternative embodiment of a one piece triplexer housing in accordance with the principles of the present invention, designated generally at 300. Note that the embodiment of FIGS. 3A-3E is only one of numerous embodiments in which the principles of the present invention may be practiced and should not be used to limit the scope of the appended claims.

Triplexer 300 is implemented as a one piece housing, which may be manufactured using the MIM process or may be manufactured using traditional machining processes. In some embodiments, triplexer 300 may be made from metal. Examples of metals that may be used include, but are not limited to, carbon steel, and 416 steel. Other suitable materials known in the art may also be used to make triplexer 300 Since only one piece is used as a housing, additional required alignment and attachment steps of multiple piece housings are reduced to a minimum, resulting in higher reliability and lower assembly cost when compared to multiple piece housings.

Figure 3A:
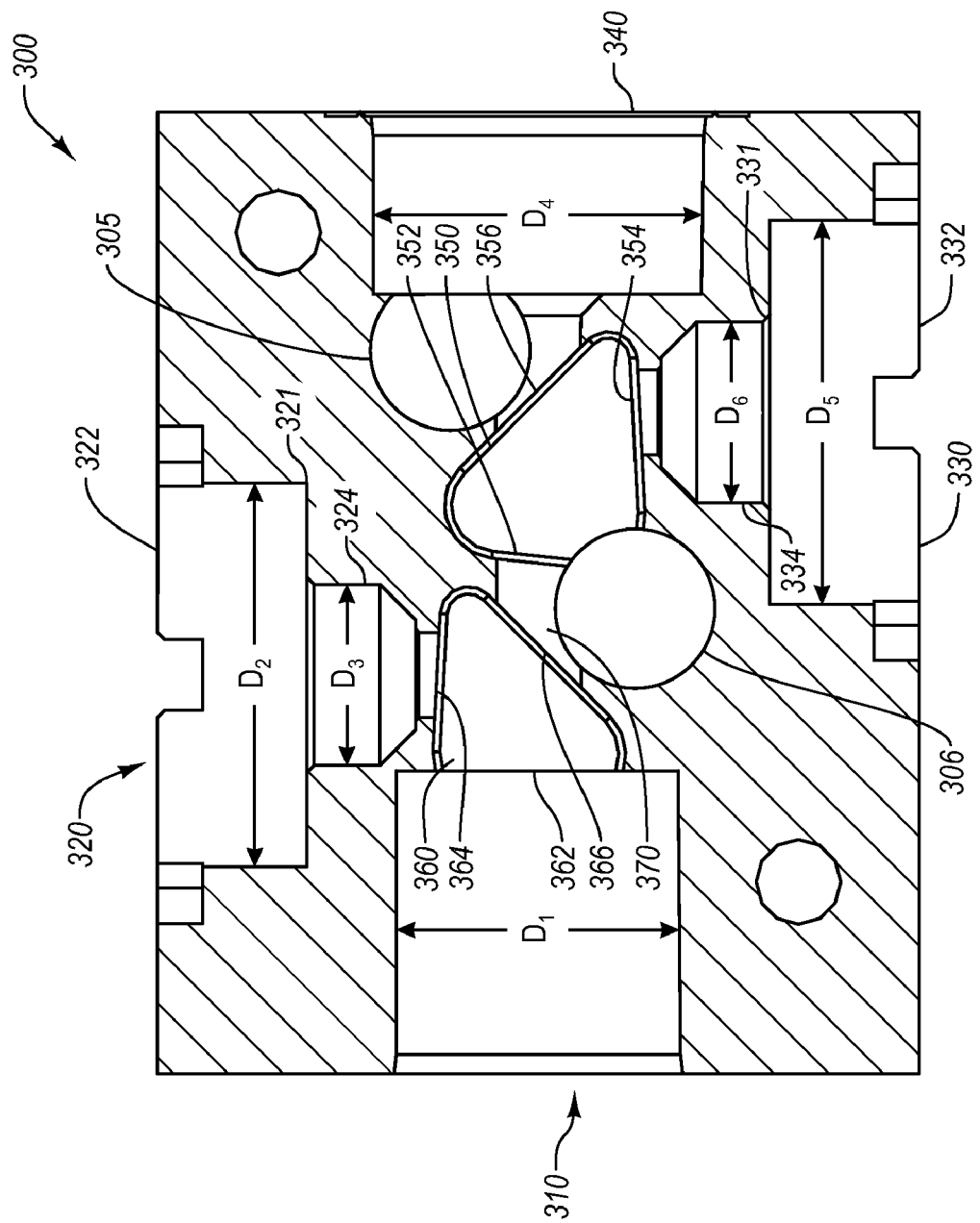
FIGS. 3A-3E illustrate an alternative embodiment of a single piece triplexer housing in accordance with the principles of the present invention.
Figure 3B:
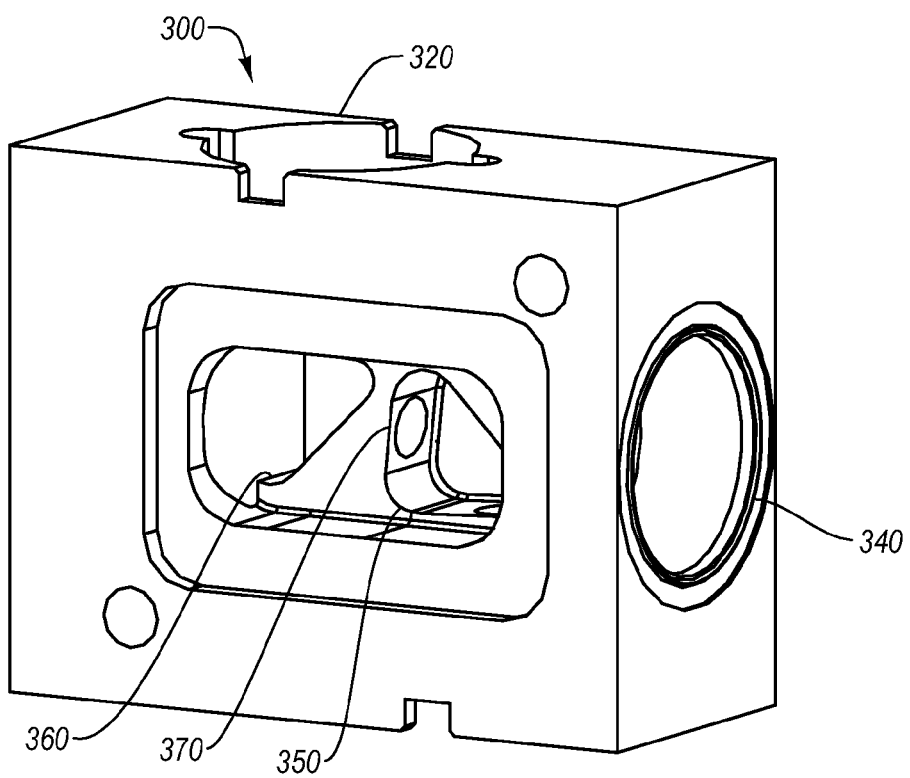
Figure 3C:
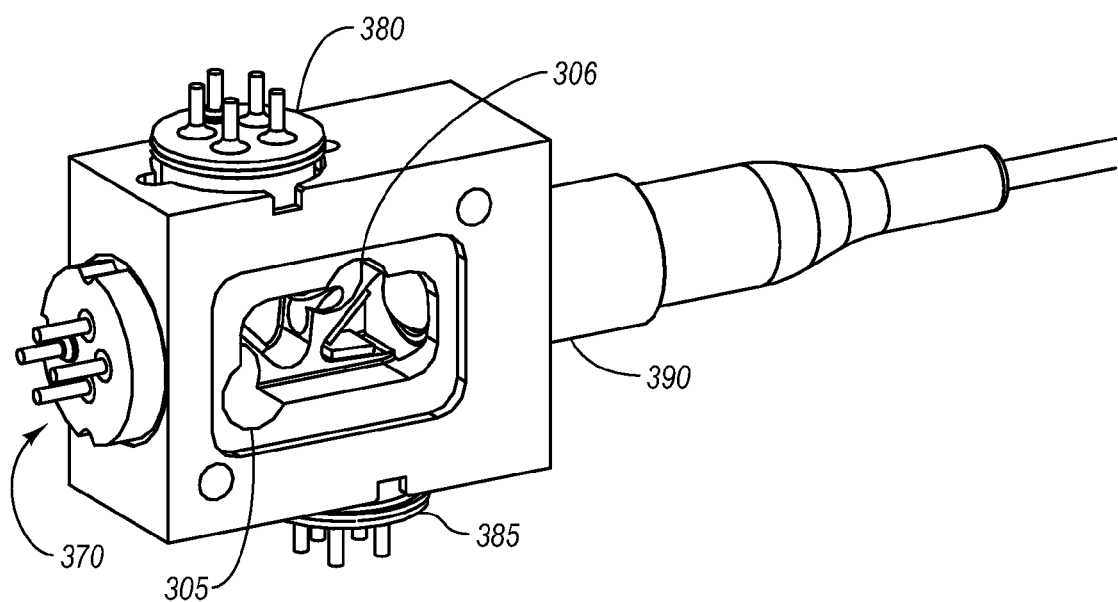
Figure 3D:
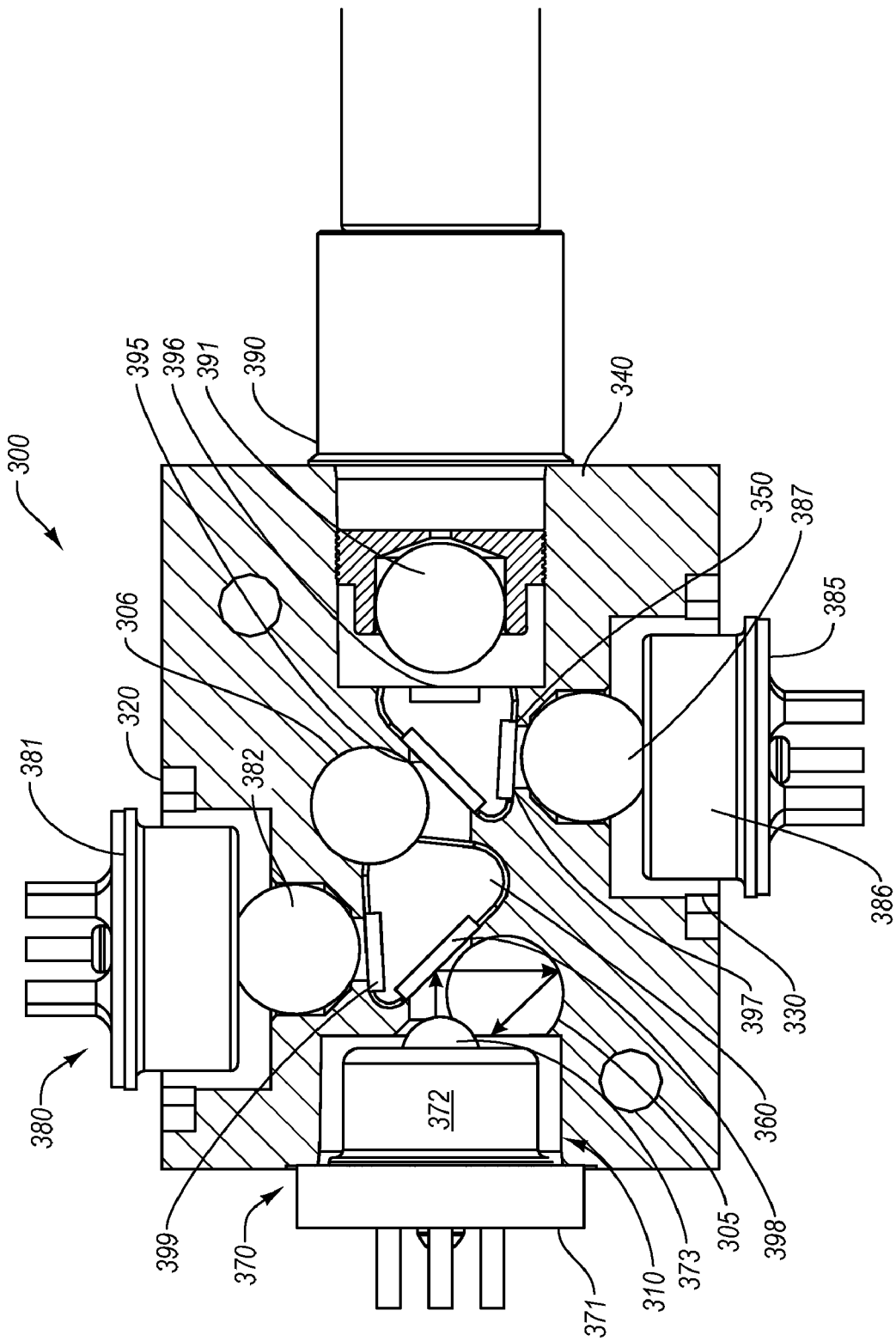

As shown in FIGS. 3A-3E, triplexer 300 includes a first receptacle 310 that is configured to hold an optical device such as an optical transmitter assembly 370. As illustrated, first receptacle 310 has a diameter D1. As is illustrated in FIG. 3D, diameter D1 is sized large enough to receive the portions assembly 271, namely laser header 271, laser can 272, and laser lens 273.

In addition, triplexer 300 includes a second receptacle 320 that is configured to hold an optical assembly such as a photodiode assembly 380. As illustrated, second receptacle 320 has a stepped diameter. For example, a first portion 322 has a diameter D2. As is illustrated in FIG. 3D, diameter D2 is sized large enough to receive a photodiode header 381.

Receptacle 320 also includes a second portion 324 that has a diameter D3 that is typically smaller than diameter D2. As illustrated, the change or step between the diameters of portions 322 and 324 creates a step 321 inside of receptacle 320. As is illustrated in FIG. 2D, diameter D3 is sized large enough to receive a photodiode lens 382.

In like manner, triplexer 300 includes a third receptacle 330 that is configured to hold an optical assembly such as a photodiode assembly 385. As illustrated, third receptacle 330 has a stepped diameter. For example, a first portion 332 has a diameter D5. As is illustrated in FIG. 3D, diameter D5 is sized large enough to receive a photodiode header 385.

Receptacle 330 also includes a second portion 334 that has a diameter D6 that is typically smaller than diameter D5. As illustrated, the change or step between the diameters of portions 332 and 334 creates a step 331 inside of receptacle 330. As is illustrated in FIG. 3D, diameter D5 is sized large enough to receive a photodiode lens 387.

Triplexer 300 also includes a fourth receptacle 340 that is configured to receive an optical fiber such as fiber 390. Receptacle 340 has a diameter D4 that is sized large enough to receive the fiber 390 and a fiber lens 391.

As further shown, triplexer 300 includes angled pocket receptacles 350 and 360, which may be manufactured by a side cut using wire cutting, mill cuts, or other known methods into one piece triplexer 300. The angled pocket receptacles 350 and 360 are triangular in shape in FIGS. 3A-3E. It will be appreciated, however, that angled pocket receptacles 350 and 360 may be various shapes and sizes as circumstances warrant. For example, in some embodiments angled pocket receptacles 350 and 360 may be shapes other than triangles. It should also be noted that in some embodiments, angled pocket receptacles 350 and 360 are manufactured to go through the entire thickness of one piece triplexer 300.

Angled pocket receptacles 350 and 360 include angled surfaces 352, 354, 356 and 362, 364, 366 respectively. Surfaces 352 and 362 are configured to hold selective filters 395 and 398 respectively. Surfaces 354 and 364 are configured hold blocking filters 397 and 399 respectively. Surfaces 356 and 366 are configured to hold additional filters as circumstances warrant, such as a filter 396. As with the previous embodiments, angled surfaces 352, 354, 356 and 362, 364, 366 allow for convenient positioning of the various filters before they are attached permanently to the surface with epoxy, which results in faster and more accurate attachment. In some embodiments, a cover (not shown) may be placed over angled pockets 350 and 360.

Angled surfaces 352, 354, 356 and 362, 364, 366 are designed to reduce cross talk and/or back reflection between optical signals during operation of triplexer 300. Advantageously, the angled surfaces 352, 354, 356 and 362, 364, 366 are an integral part of one piece triplexer 300, thus removing the need for separate parts to house the various filters.

In addition, angled surfaces 352, 354, 356 and 362, 364, 366 may be implemented with various angles as circumstances warrant to help maximize the cross talk and back reflection reduction. For example, in the current embodiment surfaces 352 and 362 may be implemented in the 40 degrees to 50 degrees range, surfaces 354 and 364 may be implemented in the 0 degrees to 10 degrees range, and surfaces 356 and 366 may be implemented in the 80 degrees to 90 degrees range.

Referring now to FIG. 3D, a one piece triplexer 300 is shown fully populated with various optical assemblies, filters, and an optical fiber. As previously described, transmit assembly 370 may be placed in first receptacle 310, photodiode assembly 380 may be placed in second receptacle 320, photodiode assembly 385 may be placed in third receptacle 330, and fiber 390 may be placed in fourth receptacle 340. Note that the placement of the various components in a specific receptacle is for illustration only and is not to be used to limit the scope of the appended claims. One of skill in the art will appreciate that the various components may be placed in other receptacles as circumstances warrant.

Figure 3E:
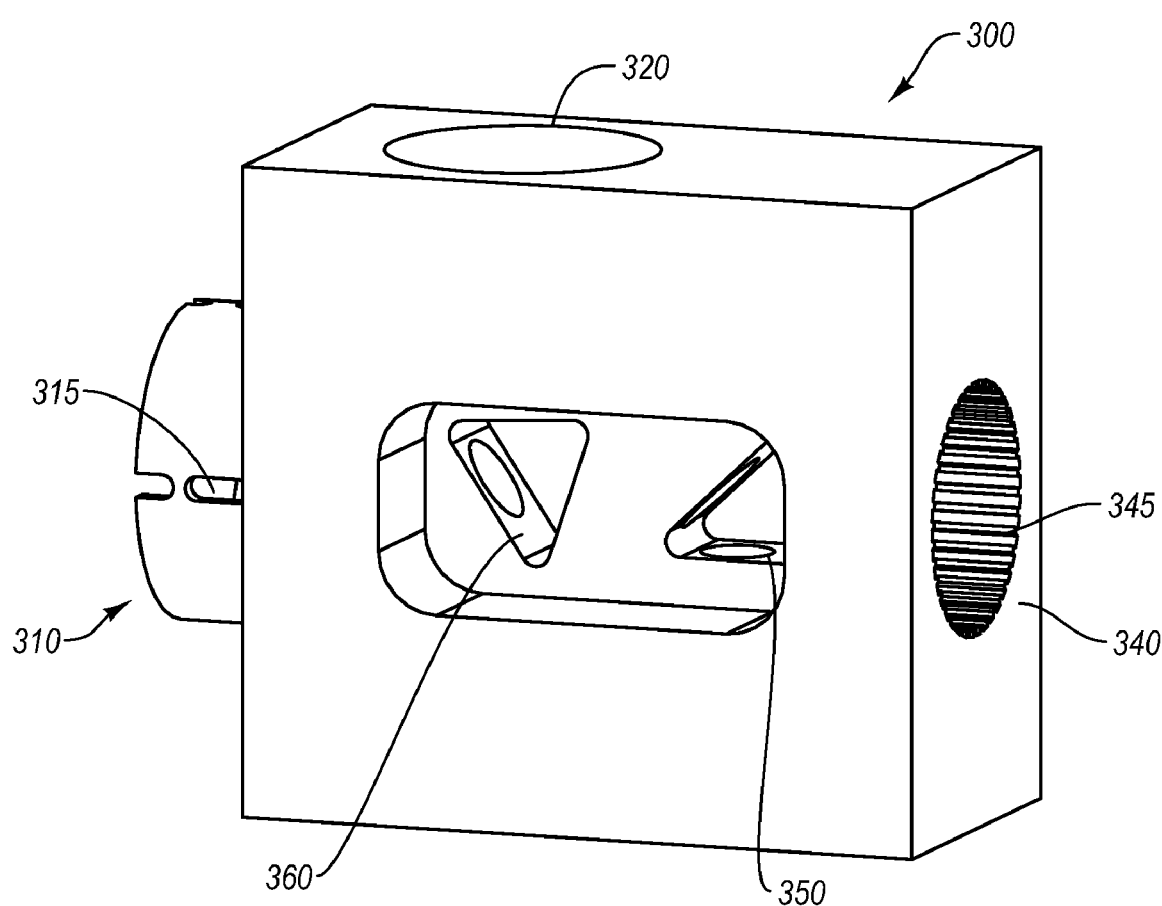

Turning now to FIG. 3E, an alternative embodiment of triplexer 300 is illustrated. As shown in this embodiment, first receptacle 310 includes a compliant press fit feature 315, which is in the form of slots such as those previously described. In addition, fourth receptacle 340 includes compliant press fit features 345, which is in the form of teeth such as those previously described. It will be appreciated that in other embodiments, compliant press fit features 315 and 345 may also be, but are not limited to, teeth, crush ribs or slots such as those described above. Compliant press fit features 315 and 345 allow for an optical assembly and/or fiber to be press fit or interference fit into first receptacle 315 and/or fourth receptacle 340. The use of compliant press fit features 315 and 345 advantageously allow for triplexer 300 to be manufactured as one piece using the inexpensive MIM process. Note that although FIG. 3E only shows receptacles 310 and 340 as including compliant press fit features 315 and 345, the other receptacles may also include compliant press fit features 315 and 345 as circumstances warrant.

Referring again to FIGS. 3A-3E, it is shown that in some embodiments one piece triplexer housing 300 also includes cuts 305 and 306. Cuts 305 and 306 may be manufactured using various machining techniques known in the art and are integral to the triplexer housing. Although illustrated as being round, cuts 305 and 306 may be other shapes such as angled slots as circumstances warrant. Advantageously, cuts 305 and 306 help to reduce cross talk between the optical assemblies of triplexer 300. This is illustrated further in FIG. 3D by the arrows in cut 305, which show how cut 305 helps to suppress cross talk between optical assembly 370 and optical assembly 380.

Figure 4A:
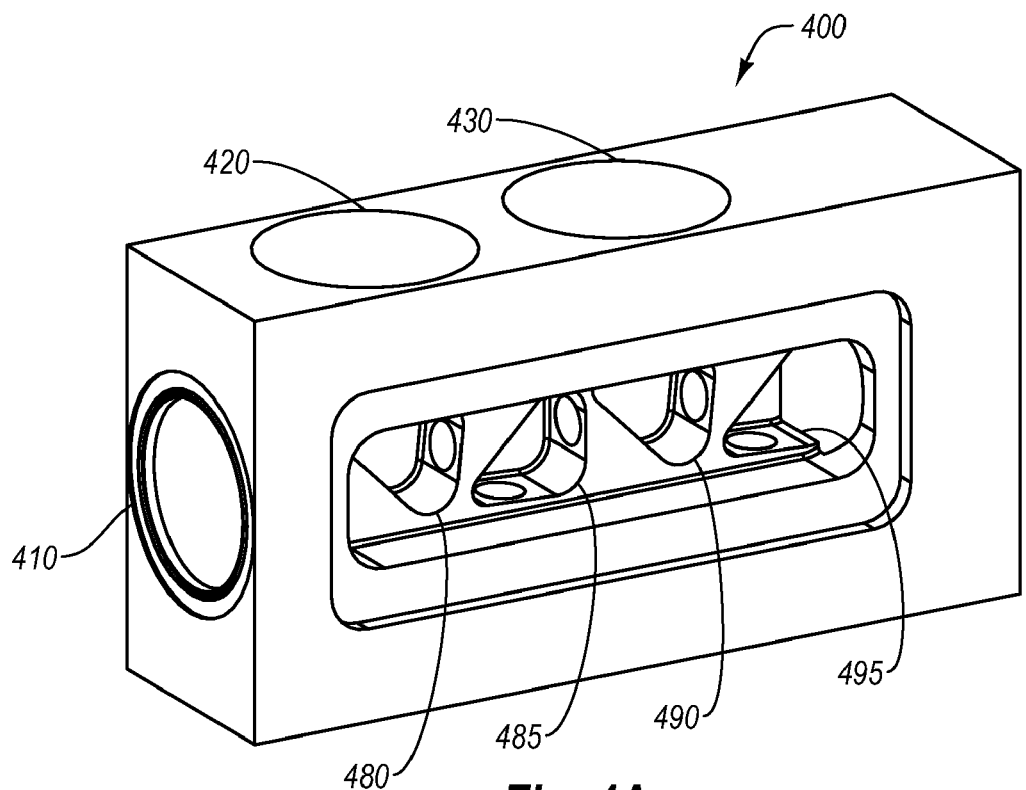
FIGS. 4A-4B illustrate an embodiment of a single piece triplexer housing that implements multiple angled pocket receptacles in accordance with the principles of the present invention.
Figure 4B:
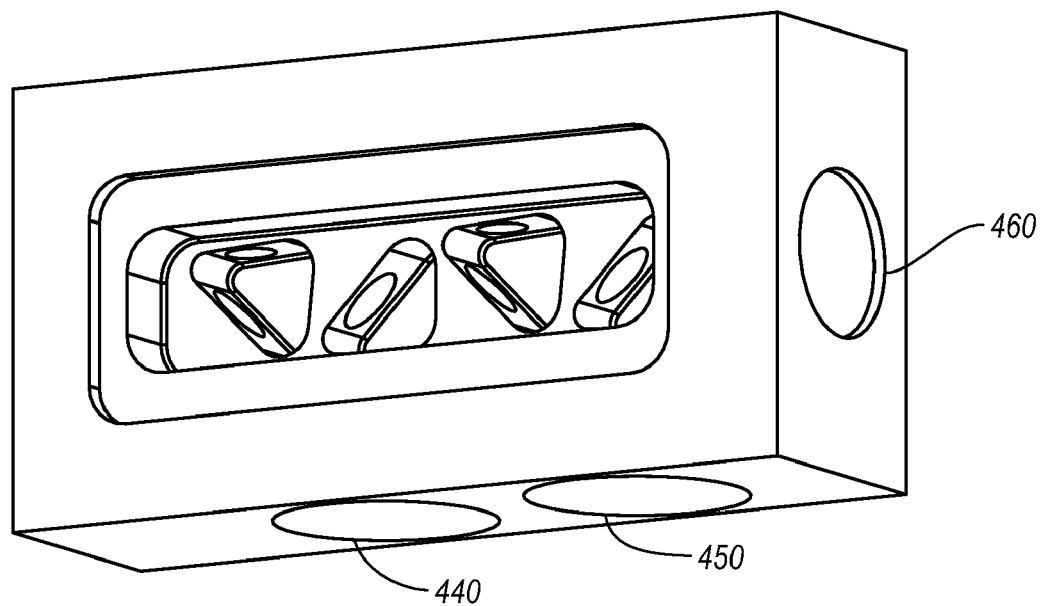

Reference is now made to FIGS. 4A and 4B, which illustrate an embodiment of a triplexer 400 that includes multiple angled pocket receptacles. As is illustrated, this embodiment includes a first receptacle 410 that is typically configured to receive an optical assembly such as a laser header. Triplexer 400 also includes second, third, fourth, and fifth receptacles 420, 430, 440, and 450 that are typically configured to receive optical assemblies such as photodiode headers. A sixth receptacle 460 is configured to receive a fiber. Receptacles 410-460 are similar to like receptacles previously described and so need not be described in further detail. Further, compliant press fit features may be included as circumstances warrant as previously described.

As previously mentioned, triplexer 400 includes multiple angled pocket receptacles 480, 485, 490, and 495. These angled pocket receptacles are configured to hold various filters as previously described in relation to angled pocket receptacles 350 and 360. The use of multiple angled pocket receptacles in a one piece triplexer housing is partially enabled by an optical design that implements a collimated (or slightly convergent) beam as described in commonly assigned, co-pending U.S. Provisional Application Ser. No. 60/889,912, filed Feb. 14, 2007, which is incorporated herein by reference in its entirety. Conventional multiple piece triplexers implement a strong convergent beam that does not leave enough space for multiple angled pocket receptacles such as those seen in FIGS. 4A-4B. It will be appreciated that even though FIGS. 4A-4B show four angled pocket receptacles, this is for illustration only. The principles of the present invention allow for more than four angled pocket receptacles to be implemented as circumstances warrant.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic module housing comprising:
   a first receptacle configured to receive a first optical assembly;
   a second receptacle configured to receive a second optical assembly;
   a third receptacle configured to receive a third optical assembly;

a fourth receptacle configured to receive an optical fiber or fiber lens;

a first triangle shaped pocket receptacle configured to have one or more optical elements placed therein;

a second triangle shaped pocket receptacle configured to have one or more optical elements placed therein;

at least one compliant press fit feature implemented as part of one of the receptacles, wherein the optoelectronic module housing is a single piece housing configured such that the receptacles and angled pocket receptacles are integral parts of the single piece housing; and at least one cross talk suppression cut proximate the first triangle shaped pocket receptacle and configured to at least partially suppress cross talk between the first and second optical assemblies.

2. The optoelectronic module in accordance with claim 1, wherein the optoelectronic module housing further includes a third angled pocket receptacle configured to have a third optical element placed therein.

3. The optoelectronic module in accordance with claim 1, wherein the compliant press fit features are one of teeth, slots, or crush ribs.

4. The optoelectronic module in accordance with claim 1, wherein the first optical assembly is a laser assembly, the second optical assembly is a photodiode assembly and the third optical assembly is a photodiode assembly.

5. The optoelectronic module in accordance with claim 1, further comprising:

a communication facilitator.

6. The optoelectronic module in accordance with claim 1, wherein the at least one cross talk suppression cut is round.

7. The optoelectronic module in accordance with claim 1, wherein the first receptacle includes a first portion with a first diameter and second portion with a second diameter that is smaller than the first diameter such that a step is created between the first and second portions; and wherein the second receptacle includes a first portion with a first diameter and second portion with a second diameter that is smaller than the first diameter such that a step is created between the first and second portions.

* * * * *